United States Patent
Nakajima et al.

(10) Patent No.: US 9,747,156 B2
(45) Date of Patent: Aug. 29, 2017

(54) MANAGEMENT SYSTEM, PLAN GENERATION METHOD, PLAN GENERATION PROGRAM

(71) Applicant: HITACHI, LTD., Tokyo (JP)

(72) Inventors: Jun Nakajima, Tokyo (JP); Masataka Nagura, Tokyo (JP); Yukinori Sakashita, Tokyo (JP)

(73) Assignee: HITACHI, LTD., Tokyo (JP)

( * ) Notice: Subject to any disclaimer, the term of this patent is extended or adjusted under 35 U.S.C. 154(b) by 77 days.

(21) Appl. No.: 14/765,039

(22) PCT Filed: Oct. 30, 2013

(86) PCT No.: PCT/JP2013/079411
§ 371 (c)(1),
(2) Date: Jul. 31, 2015

(87) PCT Pub. No.: WO2015/063889
PCT Pub. Date: May 7, 2015

(65) Prior Publication Data
US 2015/0370627 A1    Dec. 24, 2015

(51) Int. Cl.
G06F 11/273   (2006.01)
G06F 11/07    (2006.01)
G06F 11/34    (2006.01)
G06F 3/06     (2006.01)
G06F 11/14    (2006.01)

(52) U.S. Cl.
CPC ......... *G06F 11/0796* (2013.01); *G06F 3/06* (2013.01); *G06F 11/0727* (2013.01); *G06F 11/0754* (2013.01); *G06F 11/0769* (2013.01); *G06F 11/0793* (2013.01); *G06F 11/3409* (2013.01); *G06F 11/1484* (2013.01); *G06F 11/3433* (2013.01)

(58) Field of Classification Search
CPC ......... G06F 3/06; G06F 11/0727; G06F 11/30
USPC ............................................ 714/3
See application file for complete search history.

(56) References Cited

U.S. PATENT DOCUMENTS

| | | | |
|---|---|---|---|
| 5,734,818 A * | 3/1998 | Kern | G06F 11/2064 714/20 |
| 8,429,453 B2 | 4/2013 | Ito et al. | |
| 2005/0102674 A1* | 5/2005 | Tameshige | G06F 9/5011 718/100 |
| 2006/0059175 A1* | 3/2006 | Shimaya | G06F 11/366 |
| 2007/0245110 A1* | 10/2007 | Shibayama | G06F 3/0605 711/165 |

(Continued)

FOREIGN PATENT DOCUMENTS

| JP | 07-244597 A | 9/1995 |
|---|---|---|
| JP | 2005-141605 A | 6/2005 |

*Primary Examiner* — Kamini Patel
(74) *Attorney, Agent, or Firm* — Volpe and Koenig, P.C.

(57) ABSTRACT

A management system that generates a plan which is a countermeasure against an event occurring in a computer system includes: a plan generating unit configured to generate a plan according to the event; and an indicator generating unit configured to generate, as a performance change evaluation indicator of the plan, information on a change in performance of a resource of the computer system, which can occur due to other subject's process executed by the other subject different from a subject of the plan when the plan generated by the plan generating unit is executed.

12 Claims, 14 Drawing Sheets

(56) References Cited

U.S. PATENT DOCUMENTS

| | | | |
|---|---|---|---|
| 2009/0313198 A1* | 12/2009 | Kudo | G06F 11/0709 706/47 |
| 2009/0313505 A1* | 12/2009 | McCroskey | G06F 11/006 714/37 |
| 2010/0100775 A1* | 4/2010 | Slutsman | G06F 11/079 714/47.2 |
| 2010/0153787 A1* | 6/2010 | Beattie, Jr. | H04L 41/0681 714/43 |
| 2010/0199132 A1* | 8/2010 | Compton | G06F 11/0709 714/57 |
| 2010/0325493 A1* | 12/2010 | Morimura | G06F 11/0709 714/39 |
| 2011/0264956 A1* | 10/2011 | Ito | G06F 11/0748 714/20 |
| 2014/0068343 A1* | 3/2014 | Nakajima | G06F 11/3051 714/39 |

* cited by examiner

Fig. 3

| Server | VM | Drive | Server data I/F | Storage | Storage data I/F | Logical volume | Disk pool | Other subject's process configuration | Role in other subject's process | Resource occupancy |
|---|---|---|---|---|---|---|---|---|---|---|
| Server A | — | A | Data I/F S1 | Storage A | Data I/F P1 | Logical volume LV1 | Pool POOL1 | Cluster 1 | Active | Unoccupied |
| | — | — | Data I/F S1 | Storage B | Data I/F P2 | Logical volume LV2 | Pool POOL2 | Cluster 1 | Standby | |
| Server B | — | B | Data I/F S2 | Storage B | Data I/F P2 | Logical volume LV3 | Pool POOL2 | — | — | — |
| | 1 | C | Data I/F S2 | Storage C | Data I/F P3 | Logical volume LV4 | Pool POOL3 | — | — | — |
| | 2 | D | Data I/F S2 | Storage C | Data I/F P3 | Logical volume LV5 | Pool POOL3 | DRS1 | Active | — |
| | 3 | | | | | | | | | — |

Fig. 4

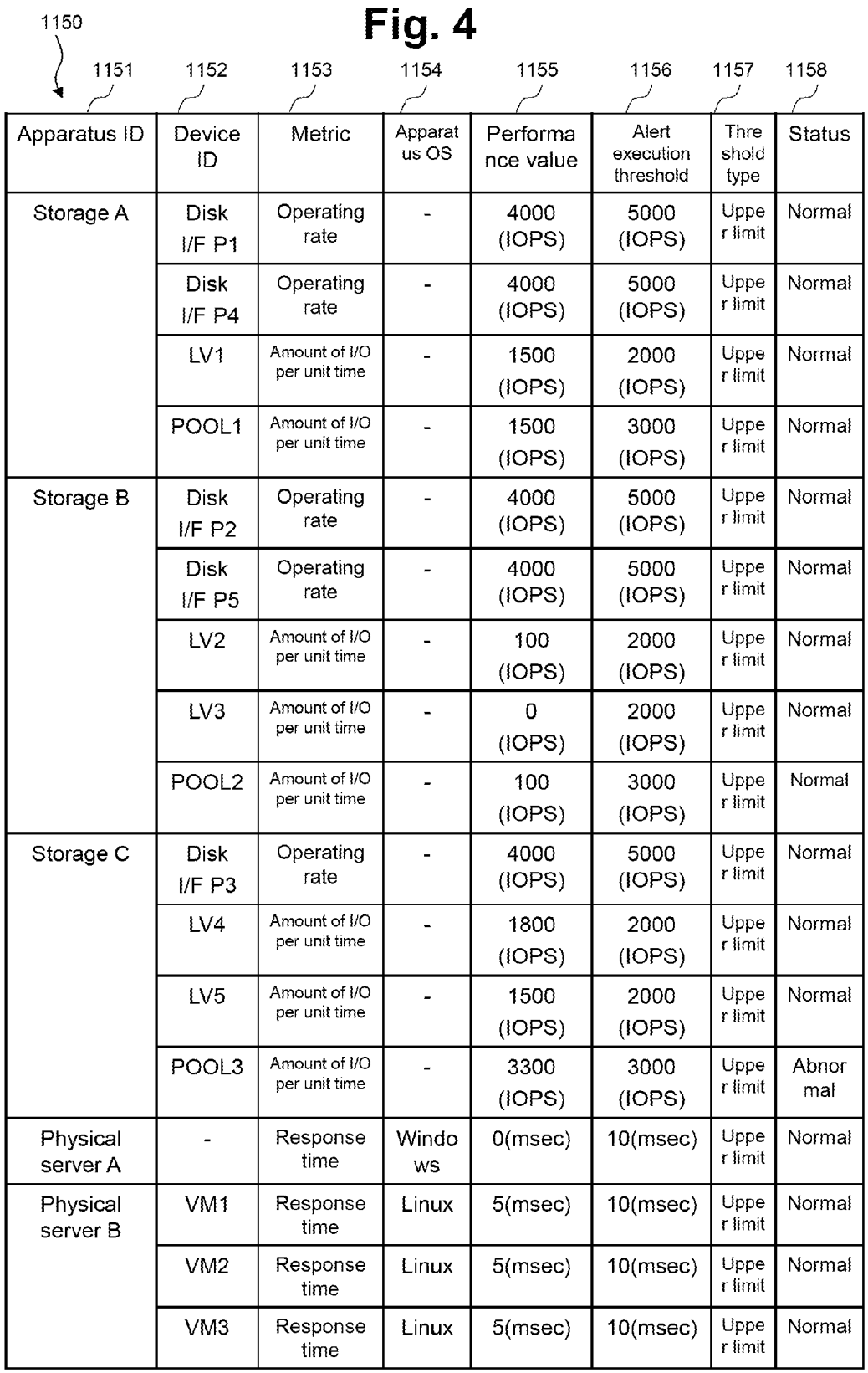

| Apparatus ID | Device ID | Metric | Apparatus OS | Performance value | Alert execution threshold | Threshold type | Status |
|---|---|---|---|---|---|---|---|
| Storage A | Disk I/F P1 | Operating rate | - | 4000 (IOPS) | 5000 (IOPS) | Upper limit | Normal |
| | Disk I/F P4 | Operating rate | - | 4000 (IOPS) | 5000 (IOPS) | Upper limit | Normal |
| | LV1 | Amount of I/O per unit time | - | 1500 (IOPS) | 2000 (IOPS) | Upper limit | Normal |
| | POOL1 | Amount of I/O per unit time | - | 1500 (IOPS) | 3000 (IOPS) | Upper limit | Normal |
| Storage B | Disk I/F P2 | Operating rate | - | 4000 (IOPS) | 5000 (IOPS) | Upper limit | Normal |
| | Disk I/F P5 | Operating rate | - | 4000 (IOPS) | 5000 (IOPS) | Upper limit | Normal |
| | LV2 | Amount of I/O per unit time | - | 100 (IOPS) | 2000 (IOPS) | Upper limit | Normal |
| | LV3 | Amount of I/O per unit time | - | 0 (IOPS) | 2000 (IOPS) | Upper limit | Normal |
| | POOL2 | Amount of I/O per unit time | - | 100 (IOPS) | 3000 (IOPS) | Upper limit | Normal |
| Storage C | Disk I/F P3 | Operating rate | - | 4000 (IOPS) | 5000 (IOPS) | Upper limit | Normal |
| | LV4 | Amount of I/O per unit time | - | 1800 (IOPS) | 2000 (IOPS) | Upper limit | Normal |
| | LV5 | Amount of I/O per unit time | - | 1500 (IOPS) | 2000 (IOPS) | Upper limit | Normal |
| | POOL3 | Amount of I/O per unit time | - | 3300 (IOPS) | 3000 (IOPS) | Upper limit | Abnormal |
| Physical server A | - | Response time | Windows | 0(msec) | 10(msec) | Upper limit | Normal |
| Physical server B | VM1 | Response time | Linux | 5(msec) | 10(msec) | Upper limit | Normal |
| | VM2 | Response time | Linux | 5(msec) | 10(msec) | Upper limit | Normal |
| | VM3 | Response time | Linux | 5(msec) | 10(msec) | Upper limit | Normal |

Fig. 5

| Other subject's process configuration type | Resource type | Configuration | Performance information |
|---|---|---|---|
| Cluster | Disk I/F | Active | All |
| | | Stanby | 0 |
| | Logical volume | Active | All |
| | | Stanby | write only |

Fig. 6

| Plan ID | Plan target | | | | | | |
|---|---|---|---|---|---|---|---|
| | Migration target | Migration source storage | Migration source pool | Migration source volume | Migration Destination storage | Migration destination pool | Migration destination volume |
| | VM ID | Storage ID | Pool ID | Volume ID | Storage ID | Pool ID | Volume ID |
| ExPlan 1-1 | VM1 | Storage C | Pool3 | LV4 | Storage B | Pool2 | LV3 |
| ExPlan 1-2 | VM1 | Storage C | Pool3 | LV4 | Storage C | Pool4 | LV3 |
| ExPlan 1-3 | VM1 | Storage C | Pool3 | LV4 | Storage D | Pool5 | LV3 |

Fig. 7

| Plan ID | Target | Performance estimate | | | | |
|---|---|---|---|---|---|---|
| | Resource ID | Performance when plan is executed (IOPS) | Other subject's process type | Performance when other subject's process occurred (IOPS) | Threshold exceed flag |
| ExPlan1-1 | LV4 | 0 | Cluster | 0 | No |
| | LV3 | 1800 | | 1800 | No |
| | LV2 | 100 | | 1500 | No |
| | Pool3 | 1500 | | 1500 | No |
| | Pool2 | 1900 | | 3300 | Yes |

Fig. 14

List of countermeasure plans (9000)

| # | Candidate plan (9001) | Performance rank (9002) | Reliability (9003) | Influenced event (9004) |
|---|---|---|---|---|
| 1 | 1 Data migration target : VM1 POOL3→POOL2 | ★★★ | ×Low | Cluster |
|   | 2 Data migration target : VM1 POOL3→POOL5 | ★★ | ○High | — |

[Details of plan] (9005)  [Execute plan] (9006)

Fig. 15

Details of plan (9100)

| Target (9101) | Performance before plan is executed (IOPS) (9102) | Estimated performance when plan is executed (IOPS) (9103) | Influenced event (9104) | Influence occurrence probability (9105) | Estimated performance when event occurred (IOPS) (9106) |
|---|---|---|---|---|---|
| Pool3 | 3300 | 1500 | Cluster | 0.1% | 1500 |
| LV2 | 100 | 100 | | | 1500 |
| LV3 | 0 | 1800 | | | 1800 |
| LV4 | 1800 | 0 | | | 0 |
| Pool2 | 100 | 1900 | | | 3300 |

Fig. 17

List of countermeasure plans (9000)

| # | Countermeasure plan (9001) | Performance rank (9002) | Reliability (9003) | Influenced event (9004) | Estimated performance when event occurred (9106) |
|---|---|---|---|---|---|
| 1 | (Step(1)) Data migration target: VM1 POOL3 → POOL2 | ★★★ | ×Low | Cluster Path switching | ★ |
|   | (Step(2)) Data migration target: VM1 POOL2 → POOL6 | ★★★ | ○High | None | |
| 2 | (Step(1)) Data migration target: VM1 POOL3 → POOL5 | ★★ | ○High | None | |

9008

```
            0    1(hr)                       12(hr)   13(hr)
Step1)       | Migration | Temporary operation  |
             ----------->======================>|
Step2)                     Resource sharing     | Migration | Normal operation
                                                ----------->----------------->
```

MANAGEMENT SYSTEM, PLAN GENERATION METHOD, PLAN GENERATION PROGRAM

TECHNICAL FIELD

The present invention relates to a technique of managing a computer system including monitoring target apparatuses such as, for example, a host computer, a network switch, and a storage apparatus.

BACKGROUND ART

In general, a computer system includes a storage apparatus that uses a hard disk drive (HDD), a solid state drive (SDD), and the like as a storage device. Moreover, a computer system that includes the storage apparatus is accessed from a plurality of high-order apparatuses (for example, host computers) via a storage area network (SAN).

In general, a storage apparatus employs a high-reliability method relying on a redundant array of independent (or inexpensive) disks (RAID) technique so as to provide the storage apparatus with a storage area having failure resistance exceeding a single drive. However, with evolution of information-oriented society in recent years, the system availability (continuity of service) based on the RAID's failure resistance is sometime insufficient.

In contrast, a high-availability configuration can be achieved by a technique called remote-copy or remote-mirroring. Volumes synchronized with remote copies are stored in a plurality of different storage apparatuses so that applications are continuously processed while changing paths in the event of a failure in the storage apparatus.

Moreover, as a data migration technique that can be used for failure recovery, VM migration in which the operating environment of a virtual machine (VM) is succeeded between physical host computers, VM-based data migration in which a VM is migrated between storage areas, and volume migration in which data of VM or the like is migrated between volumes of a storage apparatus are known.

A technique of recovering a failure using a recovery method (plan) obtained by analyzing the causes of a failure in a computer system is known. PTL 2 discloses a technique of storing a general rule and a failure recovery method in association and selecting a recovery method based on an event that caused the failure.

CITATION LIST

Patent Literature

[PTL 1]
Japanese Patent Application Publication No. H7-244597
[PTL 2]
U.S. Pat. No. 8,429,453 (Description)

SUMMARY OF INVENTION

Technical Problem

In a redundant system environment, some processes are automatically activated in order to improve availability. An example of such a process is a path switching process of switching from a first storage to a second storage in a high-availability configuration.

Thus, a process such as the process of enhancing availability automatically is sometimes performed in the computer system under the control separate from a countermeasure against the problem in focus. However, in the technique disclosed in PTL 2, when a countermeasure plan against a problem occurring in a computer system is created, the influence of a process performed under the control separate from the countermeasure against the problem in focus is not taken into consideration.

An object of the present invention is to provide a technique of enabling the influence of a process performed under the control separate from a countermeasure against a problem occurring in a computer system to be taken into consideration when a countermeasure plan against the problem is created.

Solution to Problem

A management system according to an aspect of the present invention is a management system that generates a plan which is a countermeasure against an event occurring in a computer system, this management system including: a plan generating unit configured to generate a plan according to the event; and an indicator generating unit configured to generate, as a performance change evaluation indicator of the plan, information on a change in performance of a resource of the computer system, which can occur due to the other subject's process executed by other subject different from a subject of the plan when the plan generated by the plan generating unit is executed.

Advantageous Effects of Invention

According to this aspect, it is possible to take the influence of a process performed under the control separate from a countermeasure against a problem occurring in a computer system into consideration when a countermeasure plan against the problem is created.

BRIEF DESCRIPTION OF DRAWINGS

FIG. 3 is a diagram illustrating an exemplary configuration of a configuration information table according to the embodiment.

FIG. 4 is a diagram illustrating an exemplary configuration of a performance information table according to the embodiment.

FIG. 5 is a diagram illustrating an exemplary configuration of a performance change information table according to the embodiment.

FIG. 6 is a diagram illustrating an exemplary configuration of a plan information table according to the embodiment.

FIG. 7 is a diagram illustrating an exemplary configuration of a plan detail information table according to the embodiment.

FIG. 14 is a diagram illustrating an exemplary configuration of a plan presenting screen according to the embodiment.

FIG. 15 is a diagram illustrating an exemplary configuration of a plan detail presenting screen according to the embodiment.

FIG. 17 is a diagram illustrating an exemplary configuration of a plan presenting screen according to the embodiment.

DESCRIPTION OF EMBODIMENT

Figure 1:
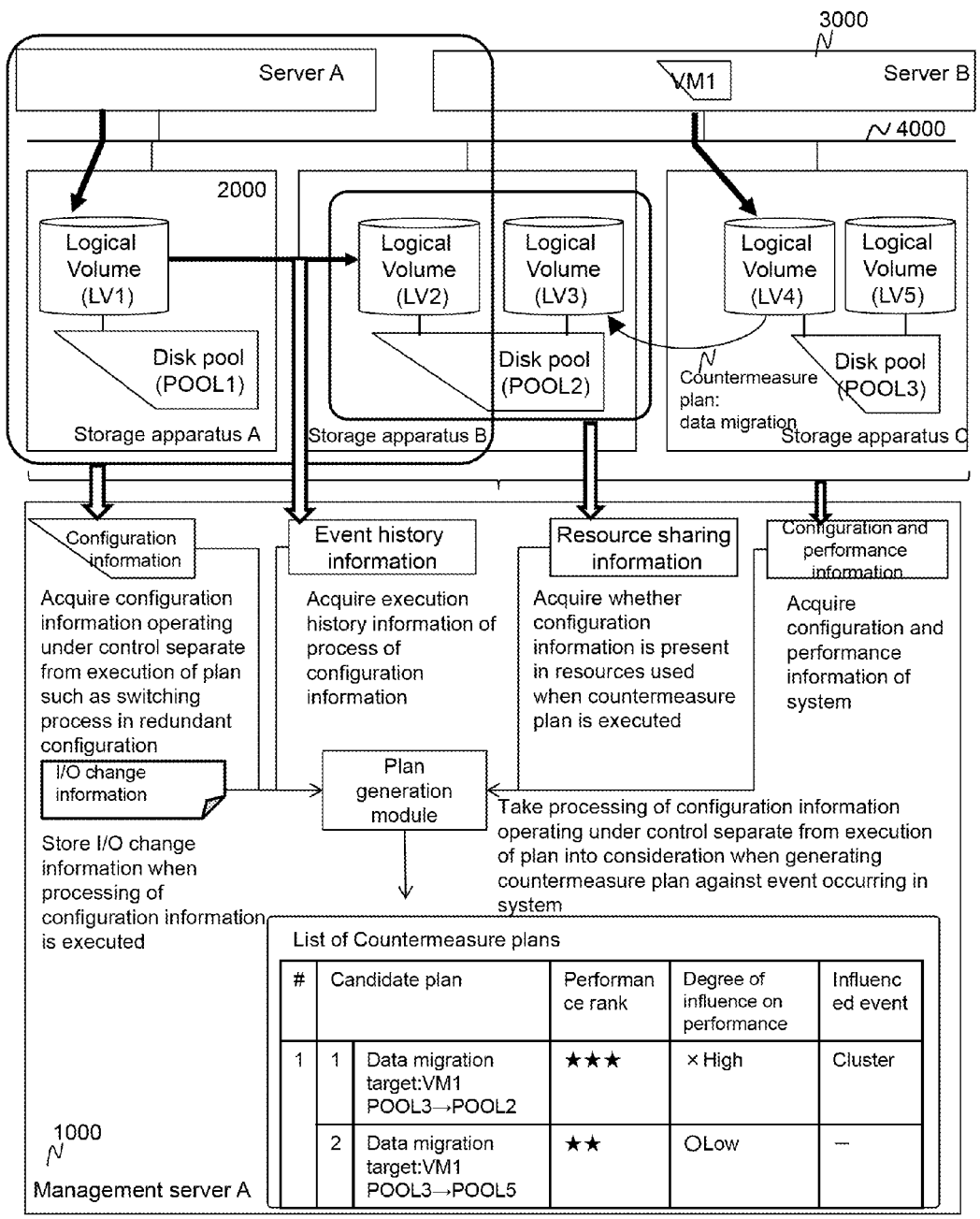
FIG. 1 is a diagram illustrating an outline according to an embodiment.

An embodiment of the present invention will be described.

The embodiment described below does not limit the inventions of the claims, and not all of the elements and combinations thereof described in the embodiment are essential to the invention as means for solving the problem. In the drawings, the same reference signs designate the same constituent components through the plurality of drawings.

A set of one or more computers, which manages the computer system and display information of the present invention, is sometimes referred to as a management system. When a management server displays the display information, the management server is the management system. Moreover, a combination of the management server and a display computer is also the management system. Furthermore, the similar process to that of the management server may be realized using a plurality of computers in order to accelerate the management process and increase the reliability. In this case, the plurality of computers (including a display computer when the display computer performs the display operation) is the management system.

In the following description, although expressions such as an "aaa table" are used, such information expressed by these expressions may be expressed using concepts other than a data structure such as a table. Therefore, in order to show that information is not dependent on the data structure, an "aaa table" may sometimes be referred to as "aaa information," for example. Furthermore, while the expressions "identifier" and "ID" are used when describing contents of the respective items of information, these expressions are interchangeable.

Although a "program" is sometimes used as a subject in the following description, a program causes a predetermined process to be performed using a memory and a communication port (a communication device, a management I/F, and a data I/F) by being executed by a processor. Thus, a "processor" may be used as a subject in the following description. In addition, a process disclosed using a program as a subject may be considered to be a process performed by a computer such as a management server and an information processing apparatus. Moreover, a part of or the whole of a program may be implemented by dedicated hardware instead of the processor. Furthermore, various programs may be installed in various computers from a program distribution server or via storage media that can be read by a computer.

A computer system according to the embodiment will be described.

FIG. 1 is a diagram illustrating an outline of the present embodiment. Respective constituent components will be described later.

A management server 1000 collects various items of information from a storage apparatus 2000 and a server 3000, including configuration information of other subject's process, such as a switching process in a redundant configuration, operating under the control separate from execution of a plan which is a countermeasure plan, information on an execution history of the other subject's process based on the configuration information, information indicating whether configuration information of the other subject's process regarding resources used when a plan is executed is present, and information on system configuration and performance. Moreover, the management server 1000 generates information on a plan with the other subject's process taken into consideration when the plan serving as a countermeasure against an event occurring in a system is generated by combining these items of information with information stored in advance regarding a change in I/O when the other subject's process is executed.

By using the technique of the present embodiment, for example, it is possible to derive a plan by taking a switching process in a redundant configuration, which is the other subject's process, into consideration. A system generally has a redundant configuration. Such a redundant configuration results in a reduction of the cost of operation management in a general system.

However, when a redundant configuration is employed, since the resources of a standby system are not used unless the active system operating in a normal operation mode is broken, it can be said that resources are not effectively utilized. In contrast, by using the technique of the present embodiment, the resources of the standby system which were not used because availability was emphasized can be presented to a user (administrator) as well as the level of a risk when the resources were used. By doing so, the user can determine whether the resources will be used by comparing the risk and the effective utilization of resources. Thus, resources can be effectively utilized.

Figure 2:
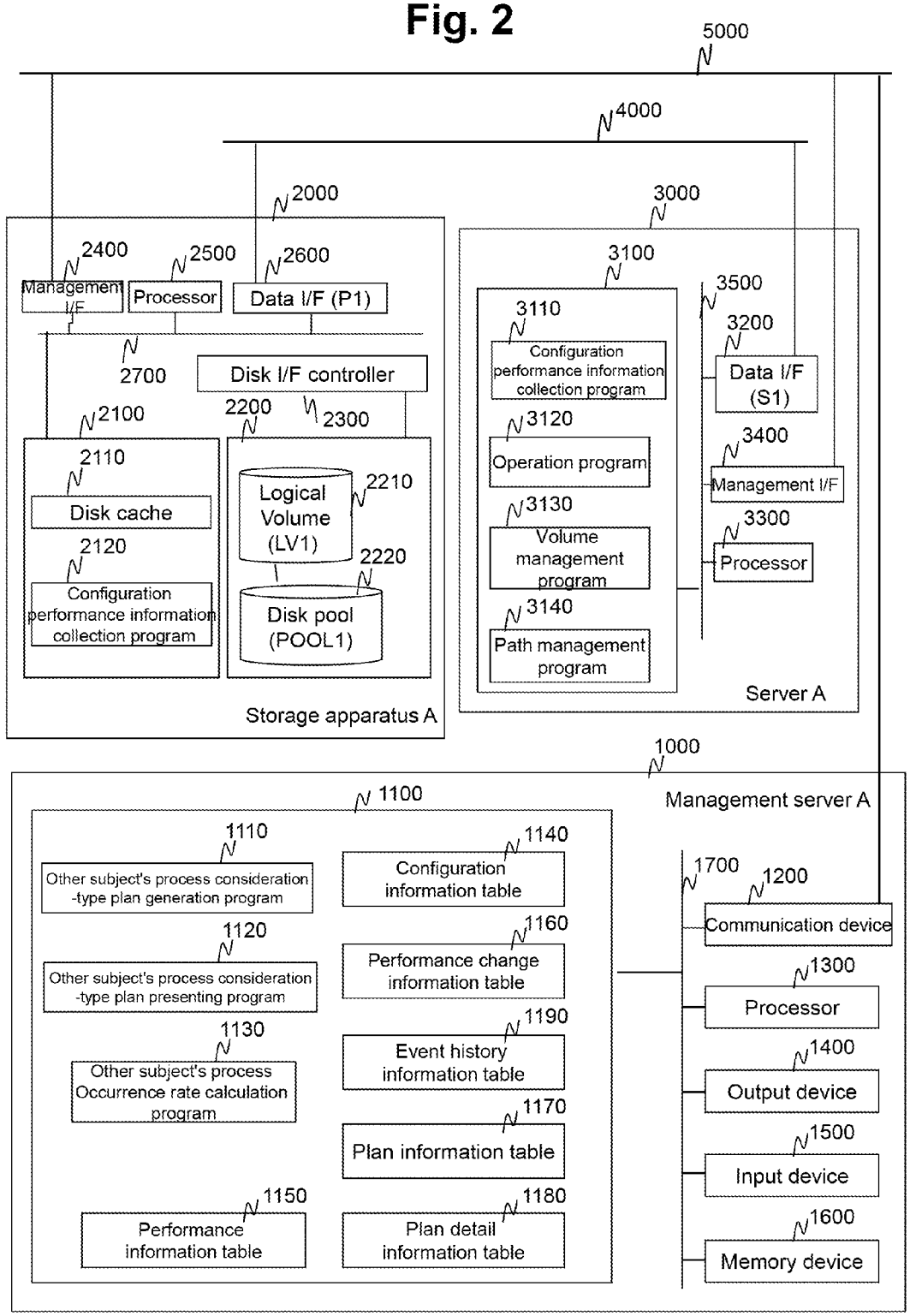
FIG. 2 is a diagram illustrating an exemplary configuration of a computer system according to the embodiment.

FIG. 2 is a diagram illustrating an exemplary configuration of a container setting portion according to the embodiment. The computer system according to the present embodiment includes at least one management server 1000 (management server A in FIG. 2), at least one storage apparatus 2000 (storage apparatus A in FIG. 2), and at least one server 3000 (server A in FIG. 2). The server 3000 and the storage apparatus 2000 are coupled to each other by a storage area network (SAN) 4000. A specific example of the SAN is a fiber channel. The management server 1000, the storage apparatus 2000, and the server 3000 are coupled to each other by a management network 5000.

The management server 1000 includes a memory 1100, a communication device 1200, a processor 1300, an output device 1400, an input device 1500, and a storage device 1600, and these components are coupled to each other by an internal bus 1700.

The memory 1100 stores an other subject's process consideration-type plan generation program 1110, an other subject's process consideration-type plan presenting program 1120, an other subject's process occurrence rate calculation program 1130, a configuration information table 1140, a performance information table 1150, a performance change information table 1160, a plan information table 1170, a plan detail information table 1180, and an event history information table 1190.

The other subject's process consideration-type plan generation program 1110 is a plan generation program that generates a plan which is a countermeasure in response to an event occurring in the computer system.

The other subject's process occurrence rate calculation program 1130 is an indicator generation program that generates information on a change in performance of resources of the computer system, which can occur due to a process (hereinafter referred to as an "other subject's process") executed by another subject (hereinafter referred to as "other subject") that does not understand a process operating under the control of a subject that executes the plan generated by the other subject's process consideration-type plan generation program 1110 when the plan is executed as a performance change evaluation indicator of the plan. Examples of the resources include a disk drive, a communication interface, a storage apparatus, and the like used in the computer system. A specific example of the information on the change in performance of resources is the other subject's process occurrence rate. The subject that executes the plan and the other subject are not necessarily present on physically different computers, but the subject that executes the plan and the other subject may be present on the physically the same computer.

According to the present embodiment, in evaluation of a plan which is a countermeasure plan against a problem occurring in the computer system, the item information of a change in the resources resulting from a process that is likely to be performed under the control separated from the examples of the countermeasure plan can be taken into consideration.

The other subject's process consideration-type plan presenting program 1120 presents the plan generated by the other subject's process consideration-type plan generation program 1110 and the performance change evaluation indicator (other subject's process occurrence rate) generated by the other subject's process occurrence rate calculation program 1130, for example. An example of the presentation is displaying of information on a display screen. Due to this, the administrator who manages the computer system can determine whether or not to execute the plan presented by the management system 10 by taking the possibility of a change in the performance of the resources into consideration.

Moreover, the other subject's process consideration-type plan presenting program 1120 may present the performance change evaluation indicator together with other effectiveness indicators regarding execution of the plan. Due to this, the administrator can evaluate the plan comprehensively from effectiveness indicators including the possibility of a change in the performance of resources.

For example, the other subject's process may be any one or more or all of a process of switching redundant paths of a cluster, a process of sharing load between redundant paths in the cluster, and a data migration process which are executed in response to an apparatus failure or a change in performance. Due to this, it is possible to evaluate plans by taking a change in performance of resources occurring when the redundant paths of the cluster are switched due to an apparatus failure or a change in performance into consideration.

Moreover, the performance change evaluation indicator includes information indicating the possibility of a change in the performance of resources included in the computer system and the amount of change in the performance. Due to this, the administrator can evaluate the plan by taking the possibility of a change in the performance of resources and the amount of change.

Moreover, the other subject's process occurrence rate calculation program 1130 may calculate the amount of change in the performance with respect to each of a read operation and a write operation. Due to this, when the changes in performance for the read operation and the write operation are different, it is possible to evaluate plans by taking the respective changes into consideration.

Moreover, the other subject's process occurrence rate calculation program 1130 may calculate the amount of change in the performance of resources according to the type of the other subject's process and the type of resources. Due to this, it is possible to evaluate plans by taking the possibilities of influence on resources, of respective other subject's processes into consideration.

Moreover, the information indicating the possibility of a change in the performance of resources may be information on an occurrence frequency of an event, calculated based on event occurrence history information collected by the computer system. Due to this, it is possible to evaluate the plans by taking the occurrence frequency of an event into consideration.

Alternatively, the information indicating the possibility of a change in the performance of resources may be information on an occurrence frequency of a hardware failure, calculated based on a hardware configuration of the computer system and failure history information collected by the computer system. Due to this, it is possible to evaluate plans by taking the hardware configuration and the occurrence frequency of the hardware failure into consideration.

Moreover, the occurrence frequency of the hardware failure may be a value calculated using a failure interval time calculated from the hardware configuration of the computer system and a failure interval time calculated from the failure history information. Due to this, it is possible to evaluate plans using an indicator based on the failure interval time estimated from the hardware configuration and the failure interval time of the hardware failures that occurred actually in the past.

The failure history information is generated, for example, from a path failure message generated by switching path software and event information generated by the computer system. Moreover, when the plan (hereinafter referred to as a "first plan") generated by the other subject's process consideration-type plan generation program 1110 influences the resources of which the performance changed due to the other subject's process, the other subject's process consideration-type plan presenting program 1120 may determine whether a plan (hereinafter referred to as a "second plan") that does not influence the resources of which the performance changes due to the other subject's process can be executed after the first plan is executed, and if executable, may present a series of plans (schedule plan) including execution of the first and second plans. Due to this, when the first plan that influences the resources of which the performance changes due to the other subject's process, if the second plan that can eliminate the influence on the resources is present, a schedule including both first and second plans is presented. Thus, it is possible to evaluate plans by taking the influence on resources and whether the influence can be eliminated into consideration.

The configuration information table 1140 stores information (that is, information indicating a connection relation between apparatuses and devices on the I/O path) indicating apparatuses and devices present on an input/output (I/O) path from the server 3000 to a disk pool that forms a logical volume used by the server 3000, information indicating a configuration of the other subject's process in relation to the connection relation, a role such as Active or Standby, of the I/O path in the other subject's process, and information on occupancy of resources in the configuration of the other subject's process. These items of information will be referred to as "configuration information."

The performance information table 1150 stores the performance information of respective monitoring target apparatuses coupled to the SAN 4000 and the devices (monitoring target devices) in the monitoring target apparatuses. The performance change information table 1160 stores information indicating the content of the configuration of the other subject's process and information on how the performance will change due to execution of the other subject's process. The plan information table 1170 stores information on a countermeasure process performed, for example, when a problem occurs in a system. The plan detail information table 1180 stores the details of the information on the countermeasure process stored in the plan information table 1170. The event history information table 1190 stores information on a device in the computer system in which an event occurred and when did the event occur and the event has been recovered.

The communication device 1200 is a device for connecting to the management network 5000. The processor 1300 executes a program expanded on the memory 1100. The output device 1400 is a device (for example, a display) that outputs the results of a process executed by the management server 1000 (for example, the execution results of the other subject's process consideration-type plan presenting program 1120). The input device 1500 is a device (for example, a keyboard) for allowing an administrator to input instructions to the management server 1000. The storage device 1600 is a hard disk drive (HDD), a solid state drive (SSD), and the like that store information.

In the example illustrated in FIG. 2, although various programs and tables are stored in the memory 1100, the programs and tables may be stored in the storage device 1600 or another storage medium (not illustrated). In this case, the processor 1300 reads a target program on the memory 1100 upon execution of a program, and executes the read program. Moreover, the programs and tables may be stored in the memory 2100 of the storage apparatus 2000 or the memory 3100 of the server 3000, and the storage apparatus 2000 or the server 3000 may execute the stored program. Moreover, another apparatus such as another server 3000 or a switch (not illustrated) may store the programs and tables and execute the stored program.

The management server 1000 can communicate with a program that operates on the server 3000 via the management network 5000.

The storage apparatus 2000 includes a memory 2100, a logical volume providing unit 2200, a disk I/F controller 2300, a management I/F 2400, a processor 2500, and a disk I/F 2600, and these components are coupled to each other by a communication path 2700 such as an internal bus.

The memory 2100 has a disk cache program 2110. Moreover, the memory 2100 stores a configuration performance information collection program 2120. The disk cache program 2110 is a storage area for temporarily storing information. The configuration performance information collection program 2120 is a program for transmitting and receiving the management information, the performance information, and the like of the storage apparatus 2000 to and from the management server 1000.

The logical volume providing unit 2200 includes a disk pool 2220 configured by the storage area of at least one physical disk (not illustrated) and is configured to logically divide the storage area of the disk pool 2220 and provide the logically divided storage area as a logical volume 2210. Due to this, an apparatus other than the storage apparatus 2000 can access the logical volume 2210. A disk pool number is assigned to the disk pool, and a logical volume number is assigned to the logical volume 2210. Due to this, the storage apparatus 2000 can uniquely identify the disk pool 2220 and the logical volume 2210.

In the example illustrated in FIG. 2, one disk pool 2220 (POOL1) is logically divided, and one logical volume 2210 (LV1) is provided to an apparatus (for example, the server 3000) other than the storage apparatus 2000. The disk I/F controller 2300 is an interface device for connecting to the logical volume providing unit 2200.

The management I/F 2400 is an interface device for connecting to the management network 5000. The processor 2500 executes a program expanded on the memory 2100. The disk I/F 2600 is an interface device for connecting to the SAN 4000.

In the example illustrated in FIG. 2, the storage apparatus 2000 includes a disk I/F (P1). In the example illustrated in FIG. 2, although the configuration performance information collection program 2120 is stored in the memory 2100, the configuration performance information collection program 2120 may be stored in another storage apparatus (not illustrated) or another storage medium (not illustrated). In this case, the processor 2500 reads the configuration performance information collection program 2120 onto the memory 2100 upon execution of a process and executes the read configuration performance information collection program 2120.

Moreover, the configuration performance information collection program 2120 may be stored in the memory 1100 of the management server 1000, and the management server 1000 may execute the stored configuration performance information collection program 2120. Moreover, another storage apparatus 2000 may store the configuration performance information collection program 2120 and execute the stored configuration performance information collection program 2120. Further, the logical volume providing unit 2200 may create all storage areas of one disk pool 2220 as one logical volume 2210. Furthermore, the logical volume providing unit 2200 may create the disk pool 2220 using a storage medium or a storage area (for example, a flash memory) other than the physical disk.

The server 3000 includes a memory 3100, a data I/F 3200, a processor 3300, and a management I/F 3400, and these components are coupled to each other by a communication path 3500 such as an internal bus.

The memory 3100 stores a configuration performance information collection program 3110, a task program 3120, a volume management program 3130, and a path management program 3140.

The configuration performance information collection program 3110 is a program for transmitting and receiving the management information, the performance information, and the like of the server 3000 to and from the management server 1000, and the task program 3120 is a program for realizing tasks executed by the server 3000 and is a data base management system (DBMS), a file system, or the like, for example. The volume management program 3130 is a program for allocating the logical volume 2210 provided by the storage apparatus 2000 to the server 3000. The server 3000 executes various tasks using the logical volume 2210 provided from the storage apparatus 2000. The path management program 3140 is a program for managing a path state between the server 3000 and the logical volume 2210 and performing a path switching process or the like when an abnormality in a path to a volume is detected.

In the example illustrated in FIG. 2, although various programs are stored on the memory 3100, the programs may be stored in another storage apparatus (not illustrated). In this case, the processor 3300 reads a target program on the memory 3100 upon execution of a process and executes the read program.

In the example illustrated in FIG. 2, the server A and the storage apparatus A are coupled to each other by the SAN 4000. The connection between the storage apparatus 2000 and the server 3000 which is a physical server is not limited to direction connection via a fiber channel, but may be coupled via at least one network apparatus such as a fiber channel switch. Moreover, the connection between the storage apparatus 2000 and the server 3000 may be realized by an Internet protocol network as long as the network is a data communication network.

FIG. 3 is a diagram illustrating an exemplary configuration of a configuration information table according to the embodiment.

The configuration information table 1140 includes information on an I/O path from the server 3000 to the disk pool that forms the logical volume 2210 provided to the server 3000, information indicating a configuration of an other subject's process in relation to the connection relation of the I/O path, a role of the I/O path in the configuration of the other subject's process, and information on occupancy of the resources in the configuration of the other subject's process.

The configuration information table 1140 includes the fields of a server field 401, a VM field 402, a drive field 403, a server data I/F field 404, a storage field 405, a storage data I/F field 406, a logical volume field 407, a disk pool field 408, an other subject's process configuration field 409, an role-in-the-other-subject's-process field 410, and a resource occupancy field 411. An identifier for uniquely identifying the server 3000 is stored in the server field 401. An identifier for uniquely identifying a VM operating on the server 3000 is stored in the VM field 402. An identifier for uniquely identifying, within a server, a mount point of the server 3000 is stored in the drive field 403. An identifier for uniquely identifying the data I/F 3200 (hereinafter sometimes referred to as a "server data I/F") of the server 3000 used when the server 3000 accesses the logical volume 2210 indicated in the identifier of the logical volume field 407 is stored in the server data I/F field 404. An identifier for uniquely identifying the storage apparatus 2000 which is an access destination of the server 3000 is stored in the storage field 405. An identifier for uniquely identifying the data I/F 2600 (hereinafter sometimes referred to as a "storage data I/F") of the storage apparatus 2000 used when the server 3000 accesses the logical volume 2210 represented by the identifier of the logical volume field 407 is stored in the storage data I/F field 406. An identifier for uniquely identifying the logical volume 2210 is stored in the logical volume field 407. An identifier for uniquely identifying the disk pool 2220 that is created by the logical volume 2210 represented by the identifier of the logical volume field 407 is stored in the disk pool field 408. Information collected from the computer system may be added in the columns 401 to 408 by general optional means.

In the other subject's process configuration field 409, an identifier for uniquely identifying the other subject's process that is automatically executed and is configured on the I/O path represented by the columns 401 to 408. The role-in-the-other-subject's-process field 410 represents the role of the I/O path in the configuration of the other subject's process configuration field 409. Here, the role indicates whether the I/O path in the cluster configuration, for example, is "Active" path or "Standby" path. Entries are added to the columns 408 to 410 based on the management information possessed by the path management program 3140 or the like. Information indicating whether the resources of a configuration in which the other subject's process is configured are to be occupied or not is stored in the resource occupancy field 411. In this example, when the value of the column is "Occupied," the resources of the configuration in which the other subject's process is configured are occupied and are not usable from another process. When the value of the column is "Unoccupied," the resources of the configuration in which the other subject's process is configured are not occupied and are usable from another process. The column 411 is added, for example, when it is registered by an administrator, and the present invention is not limited to this.

In this example, although the configuration information table 1140 according to the present embodiment includes information indicating that the server 3000, the storage apparatus 2000, and the like are present as the apparatus and the device present on the access path, the present invention is not limited to this. For example, the configuration information table 1140 may include information such as a switch and the data I/F of the switch and may store information of the task program (DBMS or the like) on the server 3000 for a predetermined task, a snapshot volume that stores a snapshot of a VM, a clone volume that stores a clone, and the like in association. Moreover, the configuration information table 1140 may store the history information of a configuration management operation and may store detailed log information indicating a system operation in collaboration with a syslog server or the like.

FIG. 4 is a diagram illustrating an exemplary configuration of the performance information table according to the embodiment.

The performance information table 1150 stores the performance information on the apparatus that forms the computer system or the device in the apparatus (for example, the performance information on the logical volume 2210, the disk pool 2220, and the like of each storage apparatus 2000). Entries may be added to the performance information table 1150 by any general means.

The performance information table 1150 includes the fields of an apparatus ID field 1151, a device ID field 1152, a metric field 1153, an apparatus OS field 1154, a performance value field 1155, an alert execution threshold field 1156, a threshold type field 1157, and a status field 1158.

An identifier (apparatus ID) for uniquely identifying an apparatus is stored in the apparatus ID field 1151. An identifier (device ID) for uniquely identifying a device of which the performance information is to be acquired is stored in the device ID field 1152. Information indicating the type of performance information such as a CPU usage rate, the number of I/O operations per unit time (for example, 1 second) (IOPS) with respect to a storage apparatus, and a request-to-response time is stored in the metric field 1153.

Data indicating the type of operating system (OS) that operates on an apparatus corresponding to the apparatus ID indicated in the apparatus ID field 1151 is stored in the apparatus OS field 1154. The value of the performance information of the type indicated in the metric field 1153, of the device indicated in the device ID field 1152, acquired from an apparatus including the device is stored in the performance value field 1155. A threshold (hereinafter referred to as an "alert execution threshold") such as an upper limit or a lower limit of a normal range of a management target performance value, designated by the user is stored in the alert execution threshold field 1156. Data indicating whether the alert execution threshold is an upper limit or a lower limit of a normal value is stored in the threshold type field 1157. Data indicating whether the performance value 1155 is a normal value or an abnormal value is stored in the status field 1158.

In this example of the performance information table 1150 illustrated in FIG. 4, although only one performance value corresponds to one optional metric of one optional device of one optional apparatus, respective items of information in the performance information table 1150 may be stored together with the time points when the respective items of information stored in respective apparatuses were acquired, and the performance values at a plurality of time points corresponding to the acquisition time points may be stored as history information. Although the storage data I/F, the logical volume 2210, the disk pool 2220, and the VM (not illustrated) has been illustrated as examples of the device of which the performance information is to be acquired and which is indicated by the device ID indicated in the device ID field 1152, the present invention is not limited to this, and the server data I/F, the physical disk, the switch, the port of the switch, and the like may be used.

Moreover, although the CPU usage rate, the IOPS, the request-to-response time, and the like has been illustrated as examples of the metric, other performance indicators such as an I/O busy rate, a transfer rate, a throughput, a buffer hit ratio of database management software, the number of inserted, updated, and deleted records, a response time of a Web server, a vacant volume or a usage rate of a file system or a disk, an input and output data amount, a use time point, the number of errors in a network interface, a buffer overflow, and a frame error may be used.

Furthermore, an average value or the like of the history information of the performance information, for example, rather than the threshold designated by the user may be used as the alert execution threshold stored in the alert execution threshold field 1156, and a threshold which is a difference between the average value and a baseline value may be employed as an alert notification trigger.

FIG. 5 is a diagram illustrating an exemplary configuration of the performance change information table according to the embodiment. In the performance change information table 1160, the configuration information of a process that is automatically executed in a system and information indicating how the performance changes due to the process are stored. In the present embodiment, although the information in the performance change information table 1160 is configured in advance for each type of the other subject's process and each type of the resources, the present invention is not limited to this.

Information indicating the type of the other subject's process that is configured to be automatically executed in the system is stored in an other subject's process type field 1161. Examples of the type of the other subject's process include a process of switching redundant paths of a cluster, a process of sharing load between redundant paths, a data migration process, and the like. Information indicating the type of resources used in configuration of the other subject's process type field 1161 is stored in a resource type field 1162. Information indicating the role of the configuration of the other subject's process type field 1161 is stored in a configuration field 1163. A value indicating how the performance information is influenced by execution of the other subject's process when the configuration has the role in the configuration field 1163 is stored in a performance information field 1164. For example, when the other subject's process configuration type is a cluster, the resource type is a disk I/F, and the configuration is "Active" and the performance information of "All" indicates that all I/O operations pass through the disk I/F. When the resource type is a disk I/F and the configuration (role) is "Standby," the performance information of "0" indicates that no I/O operation passes through the disk I/F. Moreover, when the resource type is a logical volume and the configuration is "Standby," the performance information of "write only" indicates that only a write I/O operation passes through the physical volume. Due to this, it can be understood that, when the other subject's process configuration type is a cluster and the configuration changes from Standby to Active, the I/O amount is changed so that all I/O operations having passed through the Active disk I/F pass through the Standby disk I/F and that read I/O operations having passed through the Active logical volume pass through the Standby logical volume.

FIG. 6 is a diagram illustrating an exemplary configuration of the plan information table according to the embodiment. A list of countermeasures (plans) when a problem such as performance deterioration occurs in the system is stored in the plan information table 1170. Information may be stored in this table according to an optional method. FIG. 6 illustrates an example in which the plan is VM-based data migration. An identifier for uniquely identifying a plan is stored in a plan ID field 1171. An identifier for uniquely identifying a migration target VM is stored in a migration target field 1172 of a plan target field. A storage that stores the data of the VM is stored in a migration source storage field 1173. A pool that stores the data of the VM is stored in a migration source pool field 1174. An identifier for uniquely identifying each volume that stores the data of the VM is stored in a migration source volume field 1175.

A storage that stores the data of the VM is stored in a migration destination storage field 1176. A pool that stores the data of the VM is stored in a migration destination pool field 1177. An identifier for uniquely identifying each volume that stores the data of the VM is stored in a migration destination volume field 1178. In the present embodiment, although the case of a VM-based data migration plan is illustrated, other countermeasures, for example, pool disk addition, VM migration, and the like may be used.

FIG. 7 is a diagram illustrating an exemplary configuration of the plan detail information table according to the embodiment. In the plan detail information table 1180, an identifier for uniquely identifying a plan is stored in a plan ID field 1182. An identifier for uniquely identifying a resource is stored in a resource ID field 1183. Information on an estimated performance when it is assumed that a plan has occurred is stored in a performance (IOPS)-after-execution-of-plan field 1184. Information indicating the type of a process configured to be automatically executed for a resource used in the plan is stored in other subject's process type field 1185. Information on an estimated performance when it is assumed that the other subject's process has occurred is stored in a performance (IOPS)-when-other-subject's-process-occurred field 1186. In this example of a threshold exceed flag field 1187, although the performance is estimated for all resources associated with a plan even when the other subject's process is not configured for all resources, the present invention is not limited to this.

Figure 8:
FIG. 8 is a diagram illustrating an exemplary example of an event history information table according to the embodiment.

FIG. 8 is a diagram illustrating an exemplary configuration of the event history information table according to the embodiment. In the event history information table 1190, information indicating a device in the computer system where an event occurred and the type of the event occurred are managed.

The event history information table 1190 includes the fields of an event ID field 1191, an occurrence time point field 1192, an apparatus ID field 1193, a resource type field 1194, a resource ID field 1195, an occurred event field 1196, an influence spreading range field 1197, and a recovery time point field 1198. An event ID which is an identifier of an event itself is stored in the event ID field 1191. Data indicating the time point when the event occurred is stored in the occurrence time point field 1192. An identifier of an apparatus in which the event occurred is stored in the apparatus ID field 1193. The type of a resource in which the event occurred is stored in the resource type field 1194. An identifier of the resource in which the event occurred is stored in the resource ID field 1195. Information indicating the contents of the event occurred is stored in the occurred event field 1196. The type of the resource of an event that occurred due to the event occurred is stored in the influence spreading range field 1197. Here, the influence spreading range may be represented by regarding that all events occurred at the same time points have occurred due to the event or using information on association between events as generally used in root cause analysis (RCA) and may be represented by optional means. The recovery time point field 1198 indicates the time point when the event occurred is recovered. Here, the time point when the event stops occurring or the time point when it was possible to acquire information from the resource indicated in the resource ID field 1195 and to confirm that the acquired information did not exceed a threshold is stored in the recovery time point field.

Figure 9:
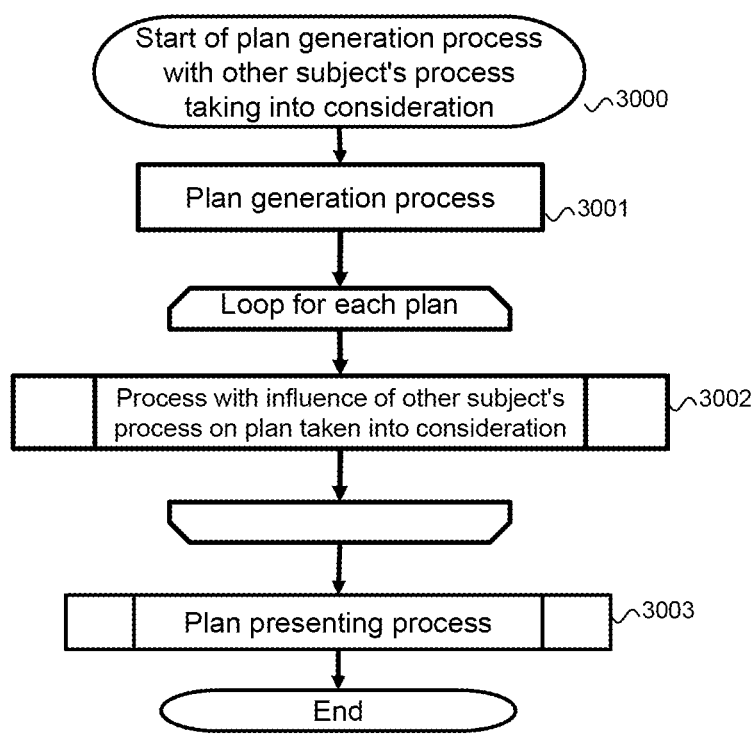
FIG. 9 is a flowchart of a plan generation process according to the embodiment with other subject's process taken into consideration.

Next, the respective processes executed by the management server 1000 will be described. FIG. 9 is a flowchart of a plan generation process with the other subject's process taken into consideration. This process is realized when the processor 1300 of the management server 1000 executes the other subject's process consideration-type plan generation program 1110 expanded on the memory 1100.

First, the other subject's process consideration-type plan generation program 1110 performs a plan generation process (step 3001). Step 3001 may be performed according to an optional method as long as a plan against a problem can be generated. The information on the plan generated as the result of the plan generation process is stored in the plan information table 1170 and the plan detail information table 1180. Examples of the information are as illustrated in the plan information table 1170 of FIG. 6 and the plan ID field 1182, the resource ID field 1183, and the performance field 1184 of the plan detail information table 1180 of FIG. 7.

Subsequently, the other subject's process consideration-type plan generation program 1110 executes a process that takes the influence of the other subject's process on the plan into consideration (step 3002) and subsequently executes the plan presenting process (step 3003), and then, the process ends.

Figure 10:
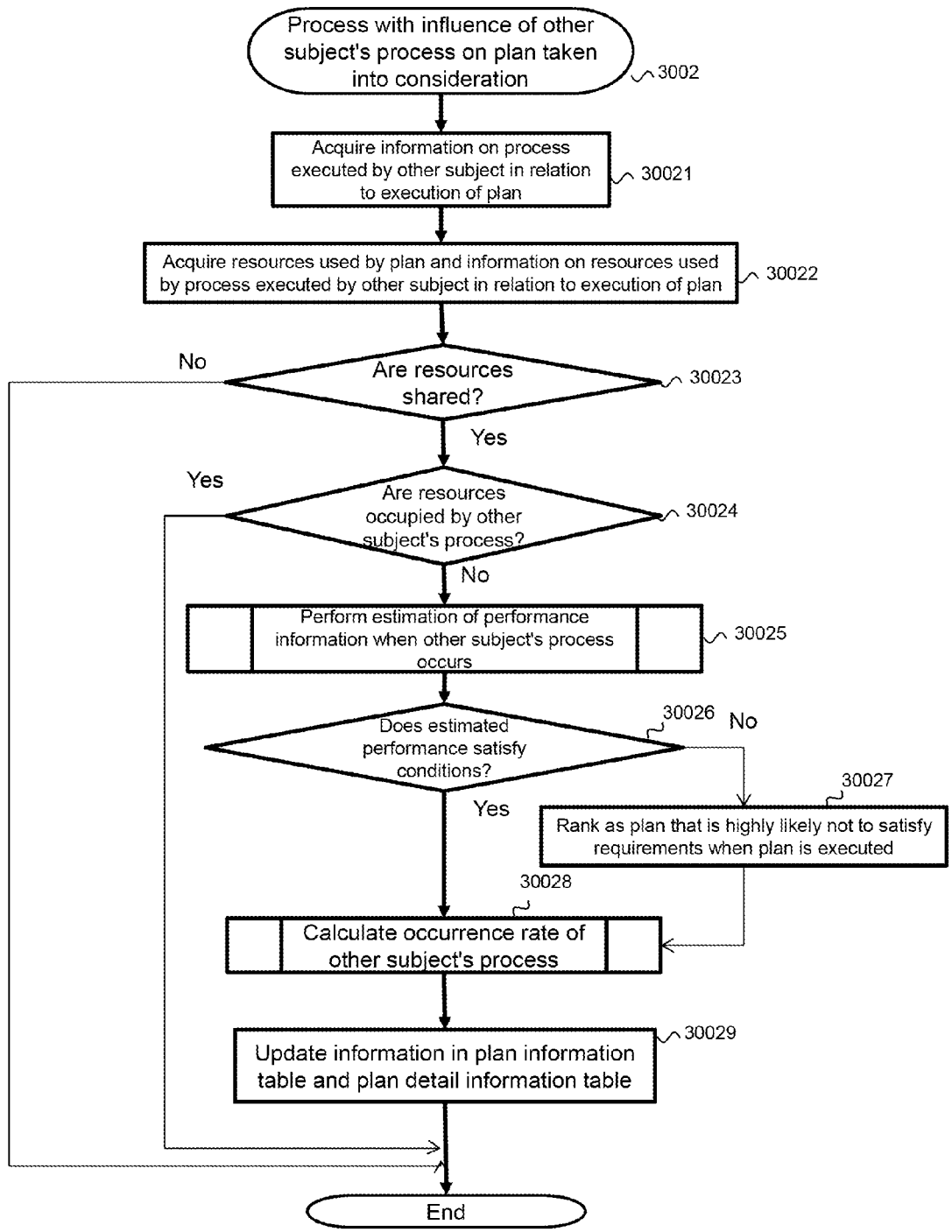
FIG. 10 is a flowchart of a process of taking the influence of the other subject's process on the plan according to the embodiment.

FIG. 10 is a flowchart of the process that takes the influence of the process executed by the other subject against the plan into consideration. This process is realized when the processor 1300 of the management server 1000 executes the other subject's process consideration-type plan generation program 1110 expanded on the memory 1100.

First, the other subject's process consideration-type plan generation program 1110 refers to the configuration information table 1140 of FIG. 3 to acquire the information on the other subject's process configured in the system (step 30021). In the present embodiment, information indicating that the logical volume LV1 of the storage apparatus A and the logical volume LV2 of the storage apparatus B are clustered for a task on the server A is acquired.

Subsequently, the resources used for execution of the plan and the resources used for the processes executed by the other subject, which differs from the subject executing the plan, are acquired (step 30022). Specifically, in this process, first, the information in the resource ID field 1183 of the plan detail information table 1180 is acquired, and the resources of the respective columns of the entries of which the value is stored in the other subject's process configuration field 409 among the entries of the configuration information table 1140 are acquired as the resources associated with execution of the plan.

Subsequently, whether the plan and the other subject's process share resources is determined based on whether the resources acquired in step 30022 overlap (step 30023). If the determination result of step 30023 shows that the resources are not shared, the process ends. If the determination result of step 30023 shows that the resources are shared, it is determined whether the other subject's process that shares the resources occupies the resources by referring to the information in the resource occupancy column 411 of the configuration information table 1140 (step 30024). When the other subject's process occupies the resources, the process ends. When the other subject's process does not occupy the resources, the performance information when it is assumed that the other subject's process has occurred is estimated (step 30025). Subsequently, the estimation result is compared with a condition (step 30026). When the performance does not satisfy the condition, it is determined that the plan when executed is likely not to satisfy the requirements, the state in the threshold exceed flag field 1187 of the plan detail information table of FIG. 7 is changed to a state indicating that the threshold is exceeded (step 30027), and the occurrence rate of the other subject's process is calculated (step 30028). In this example, "Yes" is stored in the threshold exceed flag field 1187 as an example of the state indicating that the threshold is exceeded. When the performance satisfies the condition, the flag is not set and the occurrence rate of the other subject's process is calculated (step 30028). The occurrence rate of the other subject's process indicates the possibility of a change in the performance of the resources due to the other subject's process. Since the occurrence rate of an event activated by the other subject's process also indicates the possibility of a change in the performance of the resources, the occurrence rate (occurrence frequency) of an event calculated based on the event occurrence history information (the event history information table 1190) may be used.

Here, the information in the alert execution threshold 1156 or the like illustrated in the performance information table 1150 can be used as the condition, for example. The value of the execution threshold may be a value configured in advance by the administrator, may be a value that is 1.2 times the past average performance history of the system, and may a certain value configured from service level agreement (SLA) required for the system. That is, the execution threshold may be set according to an optional method. Moreover, in the present embodiment, although the performance and the performance requirements are used as information for making determination on the plan, indicators other than the performance, for example, a volume, reliability, and the like may be used as the information for making determination on the plan.

Lastly, the information in the plan information table 1170 and the plan detail information table 1180 is updated (step 30029).

Figure 11:
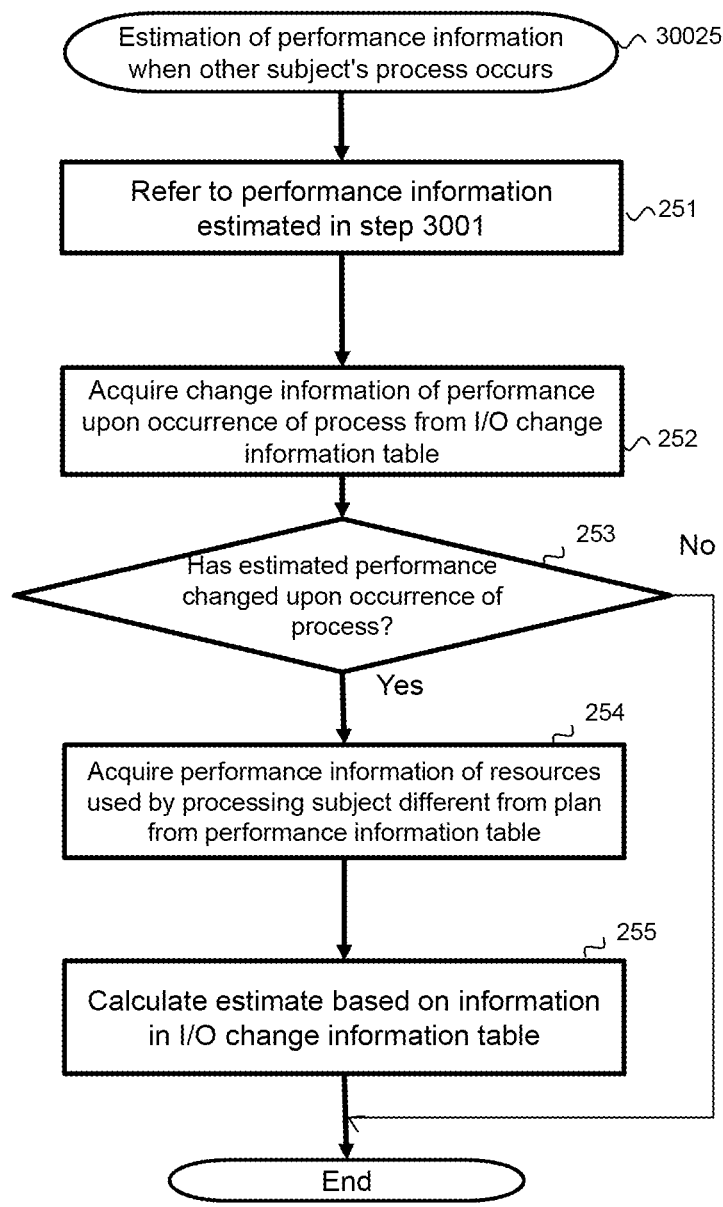
FIG. 11 is a flowchart of a process of estimating performance information upon occurrence of the other subject's process according to the embodiment.

FIG. 11 is a flowchart of a process of estimating the performance information when the other subject's process has occurred. This process illustrates the details of step 30025 illustrated in FIG. 10 and is realized when the processor 1300 of the management server 1000 executes the other subject's process consideration-type plan generation program 1110 expanded on the memory 1100. With this process, the amount of change in the performance due to the other subject's process is obtained.

First, the performance information of the resource of the performance estimation performed in step 3001 of FIG. 9 is referred to (step 251).

Subsequently, information on how the performance changes when the process occurs is acquired by referring to the performance change information table 1160 of FIG. 5 (step 252).

For example, in the example illustrated in FIG. 5, it can be understood that, when the other subject's process type is a cluster and the resource type is a disk I/F, all I/O operations are passed to an Active disk I/F and that, when the other subject's process type is a cluster and the resource type is a logical volume, all I/O operations are passed to an Active volume and a write I/O operation is passed to a standby logical volume. Moreover, whether the estimated performance changes when the other subject's process occurs is determined based on the acquired information (step 253).

When the estimated performance does not change, the process ends. When the estimated performance changes, the performance information of the resources used by the other subject's process is acquired from the performance information table 1150 of FIG. 4 (step 254). The amount of change occurring in the estimated performance when the process has occurred (for example, a read I/O operation (not illustrated) of the logical volume is acquired as the performance value. Subsequently, an estimated value when it is assumed that the other subject's process has occurred is calculated together with the information on the estimation result acquired in step 251 (step 255). Here, the estimated value to be worked out is the amount of change in the performance when the other subject's process is a switching process like a cluster of an Active-Standby configuration and is a width of change in the performance when the other subject's process is a switching process like a cluster of a load sharing configuration (Active-Active configuration). As an estimation method, the amounts of I/O operations per unit time, of a migration target volume, a migration source pool, and a migration destination pool may be acquired from the performance information table 1150 as the performance values, the amount of I/O operations per unit time of the migration target volume may be subtracted from the amount of I/O operations per unit time of the migration source pool, the subtraction result may be added to the amount of I/O operations per unit time of the migration destination pool, and the amounts of I/O operations of the migration source pool and the migration destination pool after execution of the volume migration may be predicted. In this example, although the amount of I/O operations per unit time is used as the performance value, an I/O response time or the like may be used.

Figure 12:
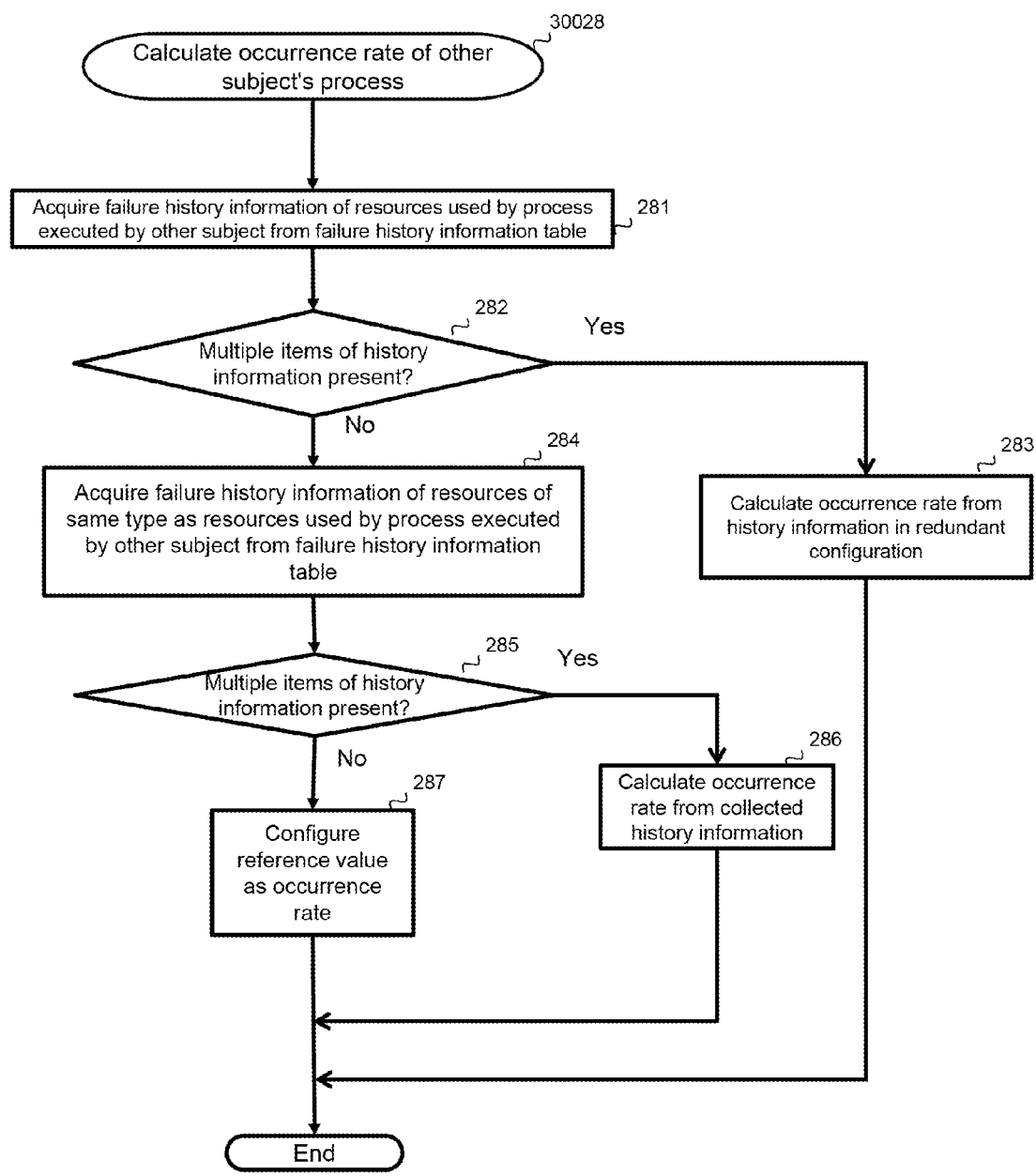
FIG. 12 is a flowchart of a process of calculating an occurrence rate of the other subject's process according to the embodiment.

FIG. 12 is a flowchart of a process of calculating the occurrence rate of the other subject's process. This process illustrates the details of step 30028 illustrated in FIG. 10 and starts when the processor 1300 of the management server 1000 executes the other subject's process occurrence rate calculation program 1130 expanded on the memory 1100.

First, the other subject's process occurrence rate calculation program 1130 acquires the failure history information of resources used for the other subject's process from the event history information table 1190. In this case, the failure history information is acquired using the information on the resources acquired in step 30022 of FIG. 10 (step 281) and it is determined whether a plurality of items of history information is present (step 282). When a plurality of items of history information is present, a process occurrence rate is calculated using the history information (step 283). Here, only items of history information having the same type of information in the influence spreading range field 1197 may be used for calculation of the occurrence rate.

As a method of calculating the process occurrence rate, for example, a method of using a failure occurrence rate (1/MTBF (mean time between failure) calculated from the specification of hardware components as a reference value and a method of using both the reference value and a MTBF value (history value) calculated from the past history may be used. However, the method of calculating the process occurrence rate is not limited to this. According to an example of a method of calculating the process occurrence rate using both the reference value and the history value, the process occurrence rate may be calculated by (1/(MTBF (reference value)+MTBF (history value)/2). Moreover, when a plurality of shared resources that include a failure history is present, the process occurrence rate may be calculated by taking the operating rate of a plurality of resources. For example, the failure rate with the information on a plurality of resources into consideration may be calculated by 1−(1−1/(MTBF (first resource))×(1−1/(MTBF (second resource)), for example. Here, although the failure rate is used as the occurrence rate, a non-operating rate (that is, 1−(MTBF/MTTR (mean time to repair)+MTBF) may be used.

Subsequently, when it is determined in step 282 that a plurality of items of history information is not included, the same failure history information in the resource type field 1194 as the resource used for the other subject's process is acquired from the failure history information table (step 284), and it is determined whether a plurality of items of history information is present (step 285). When a plurality of items of history information is present, the occurrence rate is calculated from the collected history information (step 286), and the process ends. When a plurality of items of history information is not present, the reference value is configured as the occurrence rate (step 287).

As for the information in the occurrence time point field 1192, the apparatus ID field 1193, the resource type field 1194, the resource ID field 1195, the occurred event field 1196, and the recovery time point field 1198 of the failure occurrence history table, the information of a path failure message issued by the path management program 3140 and the information of a server information message (SIM) issued by the storage apparatus 2000 are acquired, and the other subject's process consideration-type plan generation program 1110 of the management server 1000 configures the acquired values. Moreover, as for the information in the influence spreading range field 1197, it is regarded that all events occurred within a predetermined period have occurred due to the event, and the information is configured by referring to the information of the resource types of the respective events. A method of configuring the values in the failure occurrence history table is not limited to this.

Figure 13:
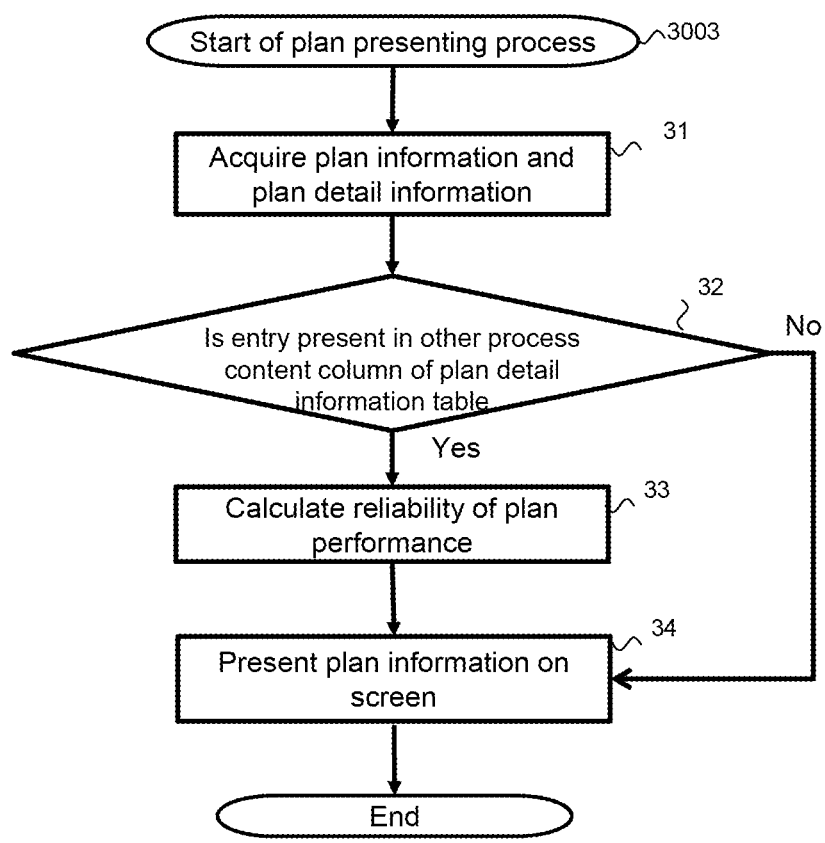
FIG. 13 is a flowchart of a plan presenting process according to the embodiment.

FIG. 13 is a flowchart of the plan presenting process. This process illustrates the details of step 3003 illustrated in FIG. 9 and starts when the processor 1300 of the management server 1000 executes the other subject's process consideration-type plan presenting program 1120 expanded on the memory 1100.

First, in step 31, the plan information stored in the plan information table 1170 of FIG. 6 and the plan detail information table 1180 of FIG. 7 is acquired (step 31). Subsequently, whether an entry is present in the other subject's process type column among the items of information in the plan detail information table 1180 is determined (step 32). When the entry is not present, the flow proceeds to step 34. When the entry is present, the reliability of a plan performance is calculated (step 33), the information on the plan as well as the calculated reliability and the information in the performance-when-other-subject's-process-occurred field 1186 and the threshold exceed flag field 1187 is displayed on the screen (step 34), and the process ends.

Here, the reliability of the plan performance is calculated based on the occurrence rate calculated in step 30028 of FIG. 12. For example, the reliability is set to "High" if the occurrence rate of the other subject's process is equal to or larger than 0% and less than 0.1%, the reliability is set to "Middle" if the occurrence rate is equal to or larger than 0.1% and less than 1%, and the reliability is set to "Low" if the occurrence rate is equal to or larger than 1%. That is, a plurality of levels of reliability may be set based on the occurrence rate of the other subject's process.

FIG. 14 is a diagram illustrating an exemplary configuration of a plan presenting screen according to the embodiment. A plan presenting screen 9000 is a screen on which information referred to when the administrator takes countermeasures when a problem occurs in the computer system is displayed. Specifically, the plan presenting screen 9000 includes a display region 9001 indicating a list of plans that can be taken as a countermeasure against the problem, a display region 9002 indicating information that normalizes the estimated performance when it is assumed that the respective plans have been executed, a display region 9003 indicating information on the reliability of the estimated performance, indicating how rarely the estimate of the plan changes, a display region 9004 indicating the information on an influential event that can change the estimated performance of the plan, a plan detail button 9005 for an operation of displaying the details of the plan, and a plan execution plan 9006 for an operation of executing the plan.

Examples of the plan information displayed in the display region 9001 include information indicating the contents of the plan, the cost required for executing the plan, the time (that is, a failure duration; also referred to as a "down time") required for executing the plan, and estimated performance information (also referred to as a "performance rank") when the plan has been executed. Further, the plan information includes information indicating the reliability of the performance and information indicating a triggering event that has an influence on the estimated performance information.

As the performance information when it is assumed that the respective plans have been executed, illustrated in the display region 9002, an estimated value (for example, the value in the performance-when-plan-was-executed field 1184 of the plan detail information table 1180) of the performance when the plan stored in the plan target field of the plan information table 1170 illustrated in FIG. 7, predicted in step 3001 of the plan generation process illustrated in FIG. 9 is used, for example. In the present embodiment, although the estimated IOPS values are classified according to the quality of the performance and are expressed by the number of star marks, other expressions (for example, an estimated value of an I/O response time) may be displayed, and other performance estimation values may be displayed. Moreover, the performance estimation values of a plurality of indicators may be displayed.

Here, the plurality of candidate plans may be arranged in descending order of the estimated values when it is assumed that the plans were executed and may be arranged in ascending order of the time required for execution of the plans. That is, the plurality of candidate plans may be arranged based on the characteristics of the plans.

Information on whether the plan is influenced by the other subject's process is presented as the performance reliability (the display region 9003). In the present embodiment, although "X Low" is displayed to indicate that the plan is influenced (that is, the reliability is low), and "O High" is displayed to indicate that the plan is not influenced (that is, the reliability is high), the present invention is not limited to this, and a larger number of levels of determination indicators may be displayed based on the degree of influence (for example, the amount of change in IOPS).

Information indicating a configuration type of the other subject's process is presented as the influential event (the display region 9004). Although "-" is displayed for a plan which does not have an influence on the configuration of the other subject's process, the present invention is not limited to this.

FIG. 15 is a diagram illustrating an exemplary configuration of a plan detail presenting screen according to the embodiment.

A plan detail presenting screen 9100 is a screen on which information on the details of plans is displayed when the plan detail button 9005 is selected and pressed when a problem occurs in the computer system and the details of the plan is displayed as information referred when the administrator takes countermeasures.

Specifically, a display region 9101 indicating the resources influenced by execution of the plan, a display region 9102 indicating the performance before execution of the plan (that is, the performance at the present time point), a display region 9103 indicating the estimated performance when it is assumed that the plan was executed, a display region 9104 indicating the type of the other subject's process in which an influence occurs, a display region 9105 indicating the occurrence probability of the other subject's process, and a display region 9106 indicating the estimated performance when it is assumed that the other subject's process was executed are presented.

For example, in the display region 9001, the performance value before execution of the plan and a predicted value of the performance value after execution of the plan may be displayed in a graph form as trend information.

FIGS. 14 and 15 are examples of a plan display screen, and information representing the characteristics of plans (for example, a list of tasks which use the resources associated with the plan and which are likely to be influenced upon execution of the plan) other than the cost required for execution of the plan and the period required for execution of the plan may be displayed in accordance with the display region 9001. Further, still another display method may be employed.

Figure 16:
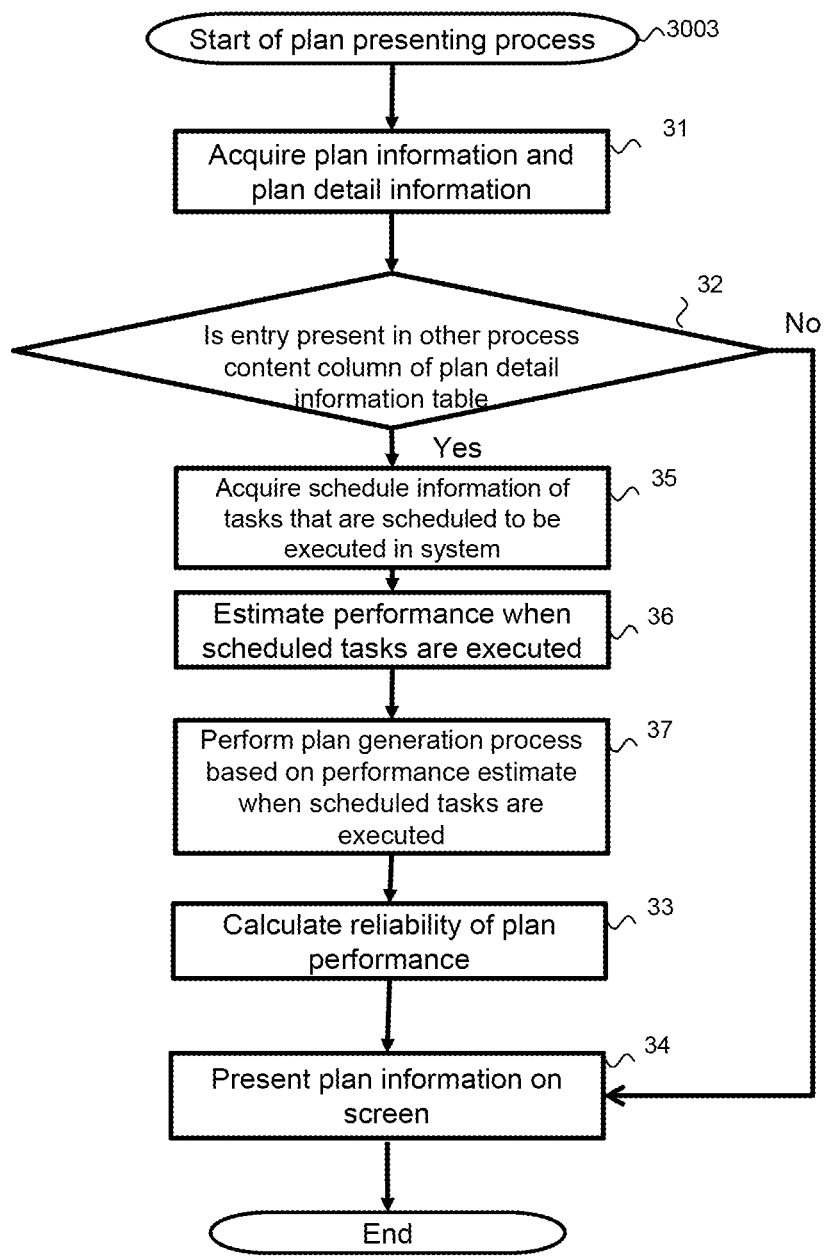
FIG. 16 is a flowchart of a plan presenting process according to the embodiment.

FIG. 16 is a flowchart of a modification of the plan presenting process. Steps 31 to 34 of the plan presenting process illustrated in FIG. 16 are the same as the processes of FIG. 13, and description thereof will not be provided.

In step 35, schedule information of tasks that are scheduled to be executed in the system is acquired. Here, the schedule information is information indicating a series of plans that are scheduled such that another plan is to be executed after a certain plan is executed and is manually input by the administrator or generated by a program on the management server 1000 and is held in the system (not illustrated). Subsequently, the performance when the scheduled tasks are executed is estimated. Here, the estimation is executed by the same method as estimation of plans (step 36). Subsequently, in step 37, the plan generation process is performed based on the estimated performance when the scheduled tasks are executed. This process is the same as the process of step 3001 illustrated in FIG. 9, and description thereof will not be provided.

For example, such a schedule plan that, if a first provisional plan that can be executed quickly has an influence on the resource of which the performance changes due to the other subject's process, the next plan that does not have an influence on the resource of which the performance changes due to the other subject's process is to be executed may be held in advance in the system as the schedule information. Moreover, it may be determined whether the next plan can be executed after the first plan is executed, and if executable, such a schedule plan may be presented.

FIG. 17 illustrates an example of the plan presenting screen according to a modification. Since the display regions 9001 to 9004 of the plan presenting screen 9000 are the same those of FIG. 14, and the display region 9106 is the same as that of FIG. 15, the description thereof will not be provided. In the example of FIG. 17, a series of schedule plans is presented by presenting a data management plan Step(2) of the VM1 from POOL2 to POOL6 as well as the data migration plan Step(1) of the VM1 from POOL3 to POOL2 based on the information on the plan generated in step 37 of the flowchart illustrated in FIG. 16. Further, the schedule plan that continues from Step(1) to Step(2) is expressed as a Gantt chart to facilitate the determination of the administrator. In this case, the time required for executing the plan is presented together so that the time required for the execution is presented as information for making determination whether or not to execute the plan.

As for the time required for the plan execution, in the case of the data management plan, for example, the management server 1000 may hold in advance the data indicating how much data volume can be migrated per unit time (for example, one second) for the respective combinations of the media type of the storage device and the RAID level of the migration source and the migration destination and may calculate the time according to the data volume to be migrated. Here, the management server 1000 may take the change in the time required for the migration in accordance with a use state in a practical environment into consideration, calculate the volume migratable per unit time using the past history information, and correct the information held in advance using the history information. For example, an average of the information held in advance and the history information may be taken. Here, although an example of the calculation method has been illustrated, the calculation method is not limited to this, and other calculation methods may be employed.

In the present embodiment, although a path switching process in a cluster configuration has been mainly described as an example of the other subject's process, the same can be applied to other examples, for example, automatic load balancing between VM hosts and a storage load sharing configuration (Active-Active configuration).

When a countermeasure against an event occurring in a system is generated, information indicating the possibility of change in the performance of resources used in a configuration where the plan is executed by the other subject's process, associated with the resources used in a configuration where the countermeasure plan is executed and the amount of change in the performance are calculated and presented as an effectiveness indicator of plan execution. In this way, it is possible to derive a plan by taking the other subject's process operating under the control separate from the execution of the plan such as a switching process in a redundant configuration into consideration.

The present invention is not limited to the embodiment described above, and various changes can be made without departing from the scope of the present invention.

REFERENCE SIGNS LIST

1000 Management server
1100 Memory
1200 Communication device
1300 Processor
1400 Output device
1500 Input device
1600 Storage device
1700 Internal bus
2000 Storage apparatus
2100 Memory
2110 Disk cache program
2200 Logical volume providing unit
2210 Logical volume
2220 Disk pool
2300 Disk I/F controller
2400 Management I/F
2500 Processor
2600 Data I/F
2700 Communication path
3000 Server
3100 Memory
3200 Data I/F
3300 Processor
3400 Management I/F
3500 Communication path
4000 SAN
401 Server
402 VM
403 Drive
404 Server data I/F
405 Storage
406 Storage data I/F
5000 Management network

The invention claimed is:
1. A management system, the management system comprising:
a network interface that is communicatively coupled to a plurality of computing systems;
a memory;
a display; and a processor communicatively coupled to the network interface, the display and the memory;

wherein the processor:

generates a first plan according to an event occurring in a subject computing system from the plurality of computing systems, generates, as a performance change evaluation indicator of the first plan, information on a change in performance of a particular resource of one or more of the plurality of computing systems, wherein the change in the performance of the particular resource occurs due to other processes executed by other computing systems from the plurality of computing systems that are different from the subject computing system, on a condition that the first plan also influences the particular resource, whether a second plan that does not influence the particular resource can be executed after the first plan is executed, and if executable, presents, using the display, a schedule plan including execution of the first and second plans, and on a condition that the first plan does not influence the particular resource, presents, using the display, the first plan and the performance change evaluation indicator.

2. The management system according to claim 1, wherein the processor further:

changes evaluation indicator together with other effectiveness indicator relating to execution of the first plan.

3. The management system according to claim 1, wherein the other processes includes at least one of:

a process of switching redundant paths of a cluster;

a process of dispersing load between redundant paths of a cluster; and a data migration process; and wherein the processes being executed in response to an apparatus failure or a change in performance.

4. The management system according to claim 1, wherein the performance change evaluation indicator includes information indicating possibility of a change in performance of the resource included in the subject computing system and information indicating an amount of change in the performance.

5. The management system according to claim 4, wherein the amount of change of the performance of the resource is calculated for each of a read operation and a write operation.

6. The management system according to claim 4, wherein the amount of change of the performance of the resource is calculated for each of a type of the other processes and a type of the resource.

7. The management system according to claim 4, wherein the information indicating the possibility of a change in performance of the resource is information on an occurrence frequency of the event, calculated based on history information relating to occurrence of events collected in the subject computing system.

8. The management system according to claim 4, wherein the information indicating the possibility of a change in performance of the resource is information on an occurrence frequency of a hardware failure calculated based on a hardware configuration of the subject computing system and failure history information collected in the subject computing system.

9. The management system according to claim 8, wherein the occurrence frequency of the hardware failure is calculated using a failure interval time calculated from the hardware configuration of the subject computing system system and a failure interval time calculated from the failure history information.

10. The management system according to claim 8, wherein the failure history information is generated from a path failure message issued by switching path software and event information occurring within the subject computing.

11. A method of generating countermeasure in a computer system, the method comprising:

generating a first plan according to an event occurring in a subject computing system from the plurality of computing systems;

generating, as a performance change evaluation indicator of the first plan, information on a change in performance of a particular resource of one or more of the plurality of computing systems, wherein the change in the performance of the particular resource occurs due to other processes executed by other computing systems from the plurality of computing systems that are different from the subject computing system;

on a condition that the first plan also influences the particular resource, whether a second plan that does not influence the particular resource can be executed after the first plan is executed, and if executable, presenting, a schedule plan including execution of the first and second plans; and on a condition that the first plan does not influence the particular resource, presenting, the first plan and the performance change evaluation indicator.

12. A non-transitory computer-readable storage medium storing a program that causes a processor to perform a sequence of operations, the sequence of operations comprising:

generating a first plan according an event occurring in a subject computing system from the plurality of computing systems;

generating, as a performance change evaluation indicator of the first plan, information on a change in performance of a particular resource of one or more of the plurality of computing systems, wherein the change in the performance of the particular resource occurs due to other processes executed by other computing systems from the plurality of computing systems that are different from the subject computing system;

on a condition that the first plan also influences the particular resource, determining whether a second plan that does not influence the particular resource can be executed after the first plan is executed, and if executable, presenting, a schedule plan including execution of the first and second plans; and on a condition that the first plan does not influence the particular resource, presenting, the first plan and the performance change evaluation indicator.

* * * * *